(12) United States Patent
Niemiec et al.

(10) Patent No.: US 12,264,922 B2
(45) Date of Patent: Apr. 1, 2025

(54) PICK-UP/DROP-OFF ZONE TRACKING SYSTEM

(71) Applicant: Uber Technologies, Inc., San Francisco, CA (US)

(72) Inventors: Konrad Julian Niemiec, Mountain View, CA (US); Jay A. Chen, San Francisco, CA (US); Shenglong Gao, San Francisco, CA (US); Mark Yen, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 751 days.

(21) Appl. No.: 16/947,028

(22) Filed: Jul. 15, 2020

(65) Prior Publication Data

US 2021/0033410 A1 Feb. 4, 2021

Related U.S. Application Data

(60) Provisional application No. 62/881,178, filed on Jul. 31, 2019.

(51) Int. Cl.
*G01C 21/34* (2006.01)
*B60W 60/00* (2020.01)
*G01C 21/36* (2006.01)
*G06F 16/2457* (2019.01)
*G08G 1/0968* (2006.01)

(52) U.S. Cl.
CPC ....... *G01C 21/3438* (2013.01); *B60W 60/001* (2020.02); *G01C 21/3605* (2013.01); *G06F 16/24578* (2019.01); *G08G 1/096811* (2013.01)

(58) Field of Classification Search
None
See application file for complete search history.

(56) References Cited

U.S. PATENT DOCUMENTS

| | | | |
|---|---|---|---|
| 9,794,753 B1* | 10/2017 | Stitt | H04L 9/3226 |
| 10,245,993 B1* | 4/2019 | Brady | B60P 7/13 |
| 2019/0286126 A1* | 9/2019 | Williams | G08G 1/202 |
| 2020/0160709 A1* | 5/2020 | Ramot | G06Q 10/047 |
| 2020/0311846 A1* | 10/2020 | Chen | G08G 1/202 |
| 2020/0314593 A1* | 10/2020 | Xu | H04W 4/025 |
| 2022/0326037 A1* | 10/2022 | Haney | G01C 21/3685 |

\* cited by examiner

*Primary Examiner* — Lail A Kleinman
(74) *Attorney, Agent, or Firm* — Schwegman Lundberg & Woessner, P.A.

(57) ABSTRACT

Aspects of the present disclosure include systems, methods, and devices to facilitate routing of an autonomous vehicle (AV) based on pick-up or drop-off zones (PDZs) that are usable by the AV at destination location. A request for one or more PDZs that are usable by a vehicle to perform a pick-up or drop-off operation at a specified location is received from a vehicular autonomy system of the vehicle. A set of PDZs that are usable by the vehicle at the specified location is identified based on an association between information associated with vehicle and one or more PDZ objects in a data store. Each PDZ object comprising data describing a PDZ. A response is generated based on the set of PDZs and transmitted to the vehicular autonomy system. The response includes at least one PDZ identifier to the set of PDZs.

20 Claims, 9 Drawing Sheets

PICK-UP/DROP-OFF ZONE TRACKING SYSTEM

CLAIM FOR PRIORITY

This application claims the benefit of priority of U.S. Application Ser. No. 62/881,178, filed Jul. 31, 2019, which is hereby incorporated by reference in its entirety.

TECHNICAL FIELD

The subject matter disclosed herein relates to autonomous vehicles (AVs). In particular, example embodiments may relate to devices, systems, and methods for operating an autonomous vehicle.

BACKGROUND

An AV is a vehicle that is capable of sensing its environment and operating some or all of the vehicle's controls based on the sensed environment. An AV includes sensors that capture signals describing the environment surrounding the vehicle. The AV processes the captured sensor signals to comprehend the environment and automatically operates some or all of the vehicle's controls based on the resulting information.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
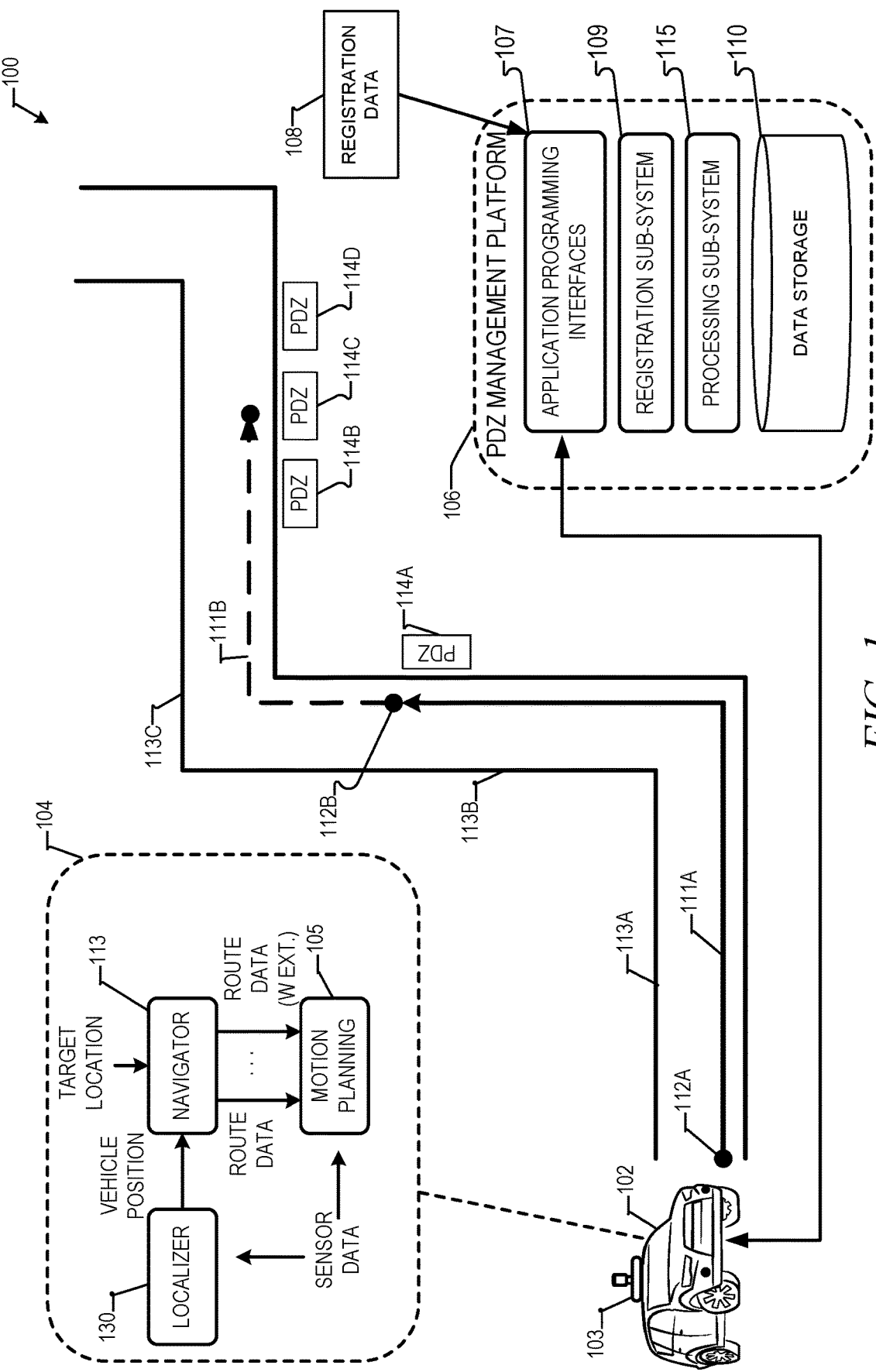
FIG. 1 is a block diagram illustrating an example environment for in which a pick-up/drop off zone (PDZ) tracking system may be implemented, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In an autonomous or semi-autonomous vehicle (collectively referred to as an AV or a self-driving vehicle (SDV)), a vehicular autonomy system controls one or more of braking, steering, or throttle of the vehicle. A vehicular autonomy system can control an AV along a route to a target location. A route is a path that the AV takes, or plans to take, over one or more roadways. In some examples, the target location of a route is associated with one or more PDZs. A PDZ is a location where the autonomous vehicle can legally stop, for example, to pick-up or drop-off one or more passengers, pick-up or drop-off one or more pieces of cargo, recharge, download new data, wait for further service request, wait for other autonomous vehicles or otherwise pull over safely. In some examples, the AV can be used to provide a ride service for passengers. A PDZ can be a place where the AV can pick-up or drop-off a passenger. In other examples, the AV can be used to provide a delivery service of food or other purchased items. A PDZ can be a place where the AV parks to pick up an item or items for delivery or a place where the AV can make a delivery of an item or items to a customer. Non-limiting examples of PDZs include parking spots, driveways, roadway shoulders, and loading docks.

A PDZ may not be useable by every AV. That is, in some instances, an AV may be permitted to use only specific PDZ. For example, policy and contractual obligations may limit which PDZs vehicles from a particular fleet or transport service provider may utilize. Moreover, in some other instances, only certain AVs may have the operational capabilities to utilize a PDZ. For example, a particular PDZ may require parallel parking to be utilized, and certain AVs may not be capable of parallel parking. In many applications, the vehicular autonomy system itself does not know if it is permitted or capable of using a particular PDZ. Tracking and locating usable PDZs is a complex and challenging problem for AVs that can needlessly consume time that could otherwise be spent providing additional ride or delivery services.

Aspects of the present disclosure address the forgoing issues with finding usable PDZs, among others, with systems, methods, and devices to facilitate routing of an AV based on PDZs that are usable by the AV at a specified location (e.g., to perform a pick-up or drop-off operation). Consistent with some embodiments, a PDZ management platform includes a PDZ registration sub-system to create and track associations between AVs and PDZs. The PDZ management platform provides responses to requests from AVs that include PDZs that may be utilized by a requesting AV at particular locations.

As provided herein a "third-party AV" comprises an AV managed, operated, or provided by a third-party entity (e.g., a third-party transport service provider) distinct from the provider of the PDZ management platform. An "internal AV" comprises an AV managed or provided by the provider of the PDZ management platform. For example, the PDZ management platform may form part of a vehicle ride-sharing platform managed and coordinated by UBER TECHNOLOGIES, of San Francisco, California, which can manage its own fleet of internal AVs owned, leased, and or otherwise operated by UBER. According to embodiments provided herein, the PDZ management platform can facilitate third-party AVs in providing ride-sharing services throughout a transport service region by supplying tracking PDZs that are usable by the third-party AVs and supplying the third-party AVs with information regarding usable PDZ. The PDZ tracking system may, for example, create an association between a set of PDZs and a fleet of third-party AVs so as to enable the PDZ management platform to respond to requests from the third-party vehicles in the fleet with identifiers of PDZs that are associated with and thereby usable by the third-party vehicles.

The PDZ registration sub-system creates associations between AVs and PDZs based on registration data that may, for example, be received from a third-party transport service provider system such as a vehicle fleet management system. The registration data includes a vehicle identifier such as a fleet identifier that may be associated with a fleet of vehicles. The registration data further comprises at least one of a set of PDZs for association with the vehicle identifier or operational capabilities of vehicles associated with the vehicle identifier. As an example, a third-party transport service provider may desire to register a fleet of vehicles with the PDZ tracking system to limit the vehicles in the fleet to utilizing certain PDZs based on, for example, certain policy or contractual obligations. The PDZ tracking system registers the vehicle identifier by updating one or more data objects that comprise data describing either a PDZ or a vehicle.

The PDZ management platform may further receive a request for one or more PDZs that are usable by a requesting vehicle (e.g., a third-party AV or internal AV) to perform a pick-up or drop-off operation at a location. The PDZ management platform identifies the one or more PDZs that are usable by the requesting vehicle at the location based on the stored associations referenced above. The PDZ management platform generates a response based on the identified one or more PDZ and provides the response to the requesting vehicle. The response includes at least one PDZ that is usable by the requesting vehicle at the location and may further include any one or more of a suggested route to a PDZ, a likelihood of availability of a PDZ, or a ranked list of PDZs. The requesting vehicle, in turn, generates a route or route extension based on the response.

With reference to FIG. 1, an example environment 100 in which a pick-up/drop off zone (PDZ) tracking system 106 may be implemented, according to some embodiments. The environment 100 includes a vehicle 102. The vehicle 102 can be a passenger vehicle such as a car, a truck, a bus, or other similar vehicle. The vehicle 102 can also be a delivery vehicle, such as a van, a truck, a tractor trailer, and so forth. The vehicle 102 is an SDV or AV that includes a vehicular autonomy system configured to operate some or all of the controls of the vehicle (e.g., acceleration, braking, steering). As an example, as shown, the vehicle 102 includes a vehicular autonomy system 104. The vehicle 102 may be either a third-party AV or an internal AV.

In some examples, the vehicular autonomy system 104 is operable in different modes, where the vehicular autonomy system 104 has differing levels of control over the vehicle 102 in different modes. In some examples, the vehicular autonomy system 104 is operable in a full autonomous mode in which the vehicular autonomy system 104 has responsibility for all or most of the controls of the vehicle 102. In addition to or instead of the full autonomous mode, the vehicular autonomy system 104, in some examples, is operable in a semi-autonomous mode in which a human user or driver is responsible for some or all of the control of the vehicle 102. Additional details of an example vehicular autonomy system are provided in FIG. 2.

The vehicle 102 has one or more remote-detection sensors 103 that receive return signals from the environment 100. Return signals may be reflected from objects in the environment 100, such as the ground, buildings, trees, and so forth. The remote-detection sensors 103 may include one or more active sensors, such as LIDAR, RADAR, and/or SONAR, that emit sound or electromagnetic radiation in the form of light or radio waves to generate return signals. The remote-detection sensors 103 can also include one or more passive sensors, such as cameras or other imaging sensors, proximity sensors, and so forth, that receive return signals that originated from other sources of sound or electromagnetic radiation. Information about the environment 100 is extracted from the return signals. In some examples, the remote-detection sensors 103 include one or more passive sensors that receive reflected ambient light or other radiation, such as a set of monoscopic or stereoscopic cameras. Remote-detection sensors 103 provide remote sensor data that describes the environment 100. The vehicles 102 can also include other types of sensors, for example, as described in more detail with respect to FIG. 3.

As an example of the operation of the vehicular autonomy system 104, the vehicular autonomy system 104 generates a route 111A for the vehicle 102 extending from a starting location 112A to a target location 112B. The starting location 112A can be a current vehicle position and/or a position to which the vehicle 102 will travel to begin the route 111A. The route 111A describes a path of travel over one or more roadways including, for example, turns from one roadway to another, exits on or off a roadway, and so forth. In some examples, the route 111A also specifies lanes of travel, for example, on roadways having more than one lane of travel. In this example, the initial route 111A extends along roadways 113A and 113B although, in various examples, routes extend over more or fewer than two roadways.

The environment 100 also includes a PDZ management platform 106 that is responsible for responding to requests for PDZs that may be utilized to perform pick-up and drop-off operations. For example, the vehicular autonomy system 104 may transmit (e.g., via a wireless network) a request for PDZs that may be utilized by the vehicle 102 to perform a pick-up or drop-off operation, and in response, the PDZ management platform 106 provides the vehicular autonomy system 104 with an indication of at least one PDZ that may be used by the vehicle 102 for the pick-up or drop-off operation at the location.

The PDZ management platform 106 comprises one or more computer server systems configured to exchange data, over a wireless network, with the vehicular autonomy system 104 of the vehicles 102. The data exchanged between the PDZ management platform 106 and the vehicular autonomy system 104 may include requests to register vehicles with the PDZ management platform 106, requests for PDZ and responses to PDZ requests. To this end, the PDZ management platform 106 exposes various application programming interfaces (APIs) 107 to the vehicular autonomy system 104.

As an example, the PDZ management platform 106 may expose a first API 107 that allows a transport service providers (not shown) to submit registration requests to the PDZ management platform 106. A vehicle may be registered with the PDZ management platform 106 to establish which PDZs the vehicle is able to use. That is, a vehicle may be registered with the PDZ management platform 106 to establish which PDZs the vehicle is either permitted to or capable of using. For example, a registration request may include registration data 108 comprising a vehicle identifier along with a list of PDZs that are to be used by vehicles associated with the vehicle identifier and/or operational capabilities of vehicles associated with the vehicle identifier. The vehicle identifier may, for example, comprise a unique identifier of the vehicle 102 or a fleet identifier corresponds to a vehicle fleet to which the vehicle 102 belongs. In this way, a third-party transport service provider may register a fleet of third-party AVs with the PDZ management platform 106 and the PDZ management platform 106 responds to PDZ requests from third-party AVs in the fleet based on either the list of PDZs that are to be used by AVs in the fleet and/or operational capabilities of AVs in the fleet.

A registration sub-system 109 of the PDZ management platform 106 is responsible for registering vehicles with the PDZ management platform 106 based on received registration data 108. To register a vehicle (or fleet of vehicles), the registration sub-system 109 may create or update data stored in data store 110. For example, the data store 110 may include a PDZ database comprising a plurality of PDZ data objects.

Each PDZ object is a data structure that comprises data that describes a PDZ such as an identifier, a location (e.g., geographic coordinates), geometry, dimensions, predetermined associations with certain locations, associations with other PDZ (e.g., a cluster definition), and legal restrictions on utilizing the PDZ. A PDZ object may further include an indication of one or more operational constraints for utilizing the corresponding PDZ. An operational constraint comprises an operational capability that is needed to utilize the PDZ. Example operational constraints relate to operating in reverse, performing parallel parking, or using particular PDZ geometries or dimensions.

In this example, the PDZ management platform 106 identifies PDZ objects in the data store 110 based on the list of PDZ identifiers or operational capabilities, and registers a vehicle by associating the vehicle identifier with each identified PDZ object. That is, the PDZ management platform 106 creates a linkage between the vehicle identifier and one or more PDZ objects in the PDZ database maintained in the data store 110. In some embodiments, the PDZ management platform 106 may update a PDZ object to create the association with the vehicle identifier.

As another example, the data store 110 may also include a vehicle database comprising a plurality of vehicle data objects. Each vehicle data object is a data structure comprising data that describes one or more vehicles. In a first example, a vehicle data object describes a single vehicle. In a second example, a vehicle data object describes a fleet of vehicles (e.g., a fleet of third-party AVs). In these examples, the PDZ management platform 106 may register a vehicle by creating or updating a vehicle object that corresponds to the vehicle identifier to indicate one or more operational capabilities of vehicles associating with the vehicle identifier.

The PDZ management platform 106 also includes a second API 107 that allows the vehicular autonomy system 104 and other network-based systems and services (first or third party) to submit requests for PDZs that may be utilized for pick-up and drop-off operations. For example, as noted above, the vehicular autonomy system 104 may submit a request for PDZs that may be utilized by the vehicle 102 to perform a pick-up or drop-off operation at the location 112B. Based on the request, a processing sub-system 115 identifies a set of PDZs that are usable by the vehicle 102 to perform a pick-up or drop-off operation at the location 112b and generates a response to the request based on the set of PDZs. The response includes at least one PDZ from the identified set of PDZs and may further include an estimated likelihood of availability of a PDZ, a suggested PDZ, and/or a route from the current location of the vehicle 102 to the suggested PDZ. The PDZ management platform 106 provides the response to the vehicular autonomy system 104 responsive to the request.

As shown in FIG. 1, the target location 112B is associated with PDZs 114A, 114B, 114C, and 114D. For example, where the target location 112B of the vehicle 102 is at or near a city block, the PDZs 114A, 114B, 114C, and 114D can be a shoulder or curb-side area on the city block where the vehicle 102 can pull-over. The PDZs 114A, 114B, 114C, and 114D may be associated with the target location 112B of the vehicle 102 based on being within a threshold distance of the target location 112B. In some examples, the PDZs 114A, 114B, 114C, and 114D are associated with the target location 112B based on the direction of travel of the vehicle 102. For example, in the United States, where traffic travels on the right-hand side of the roadway, PDZs on the right-hand shoulder of the roadway relative to the vehicle 102 are associated with a target location, such as 112B, while PDZs on the left-hand shoulder of the roadway may not be, as it may not be desirable for the vehicle 102 to cross traffic to reach the left-hand shoulder of the roadway.

Upon receiving a request for one or more PDZs that may be used by the vehicle 102 to perform a pick-up or drop-off operation at the location 112B, the PDZ management platform 106 initially identifies the PDZs 114A, 114B, 114C, and 114D as being associated with the target location 112B. From the PDZs 114A, 114B, 114C, and 114D, the PDZ management platform 106 identifies a set of PDZs that are usable by the vehicle 102. Although each of the PDZs 114A, 114B, 114C, and 114D are associated with the target location 112B, the vehicle 102 may only be able (permitted or capable) to utilize a subset of the PDZs 114A, 114B, 114C, and 114D.

In a first example, the PDZ management platform 106 may access PDZ objects from the data store 110 that correspond to PDZs 114A, 114B, 114C, and 114D and determines whether any one of these records are linked to a vehicle identifier of the vehicle 102. In a second example, the PDZ management platform 106 may compare operational constraints of the PDZs 114A, 114B, 114C, and 114D (e.g., as described by corresponding PDZ objects in the data store 110) to operational capabilities of the vehicle 102 (e.g., as indicated by a corresponding vehicle object stored in the data store 110) to identify which, if any, PDZs that the vehicle 102 is capable of utilizing.

The PDZ management platform 106 generates a response to the request based on PDZ that are identified as being usable by the vehicle 102 and transmits the response to the vehicular autonomy system 104 responsive to the request. The response includes at least one of the identified PDZs. In some embodiments, the response may include a value indicating a likelihood that a PDZ included in the response will be available at the estimated time of arrival of the vehicle 102.

In some embodiments, the response may further include a suggested PDZ selected from the PDZs that are usable by the vehicle 102 to perform pick-up or drop-off operations at the location 112B. In some embodiments, the response further includes a route to the suggested PDZ.

The vehicular autonomy system 104 controls the vehicle 102 along the route 111A towards the target location 112B. For example, the vehicular autonomy system 104 controls one or more of the steering, braking, and acceleration of the vehicle 102 to direct the vehicle 102 along the roadway according to the route 111A. Upon receiving the response from PDZ management platform 106, the vehicular autonomy system 104 may refine the route 111A or generate a new route based on a PDZ included in the response.

In a first example, based on the response identifying the PDZ 114C as a PDZ that is usable by the vehicle 102 to perform a pick-up or drop-off operation at location 112B, the vehicular autonomy system 104 may generate a route that extends from the starting location 112A to the PDZ 114C. In this example, the route includes an extension 111B that traverses the roadway 113B and roadway 113C with a right turn from the roadway 113B to the roadway 113C.

In a second example, the response identifies PDZs 114C and 114D as being usable by the vehicle 102 and indicates that the PDZ 114C is the suggested PDZ. In this example, despite the response identifying the PDZ 114C as a suggested PDZ, the vehicular autonomy system 104 may instead select PDZ 114D as the suggested PDZ, and generates a route that extends from the starting location 112A to the PDZ 114D.

In some examples, the vehicular autonomy system 104 separates the process of stopping the vehicle 102 at a PDZ from generating routes and/or route extensions. For example, the vehicular autonomy system 104 of FIG. 1 includes a localizer system 130, a navigator system 113, and a motion planning system 105. The navigator system 113 is configured to generate routes, including route extensions. The motion planning system 105 is configured to determine whether PDZs associated with a target location are available, and cause the vehicle to stop at a PDZ that is available. The navigator system 113 continues to generate route extensions, as described herein, until the motion planning system 105 causes the vehicle 102 to stop at a PDZ.

The localizer system 130 can receive sensor data from remote detection sensors 103 (and/or other sensors) to generate a vehicle position. In some examples, the localizer system 130 generates a vehicle pose including the vehicle position and vehicle attitude, described in more detail herein. The vehicle position generated by the localizer system 130 is provided to the navigator system 113. The navigator system 113 also receives and/or accesses target location data describing the vehicle's target location. The target location data can be received from a user, from PDZ management platform 106, from another component of the vehicular autonomy system 104, and/or from another suitable source. In some embodiments, the navigator system 113 uses the target location data and the vehicle position to generate route data describing the route 111A with extension 111B. In some embodiments, at least a portion of the route data may be provided by the PDZ management platform 106 with the response to the PDZ request. The route data can include an indication of the route 111A and of PDZ 114C. The route data is provided to the motion planning system 105.

The motion planning system 105 uses the route data to control the vehicle 102 along the route 111A with extension 111B. For example, the motion planning system 105 sends control commands to the throttle, steering, brakes, and/or other controls of the vehicle 102 to cause the vehicle 102 to traverse the route 111A. The motion planning system 105 is programmed to stop the vehicle 102 if the vehicle 102 approaches PDZ 114. The navigator system 113 continues to generate route data describing routes, for example, until the motion planning system 105 successfully stops the vehicle 102 at the PDZ 114C.

Figure 2:
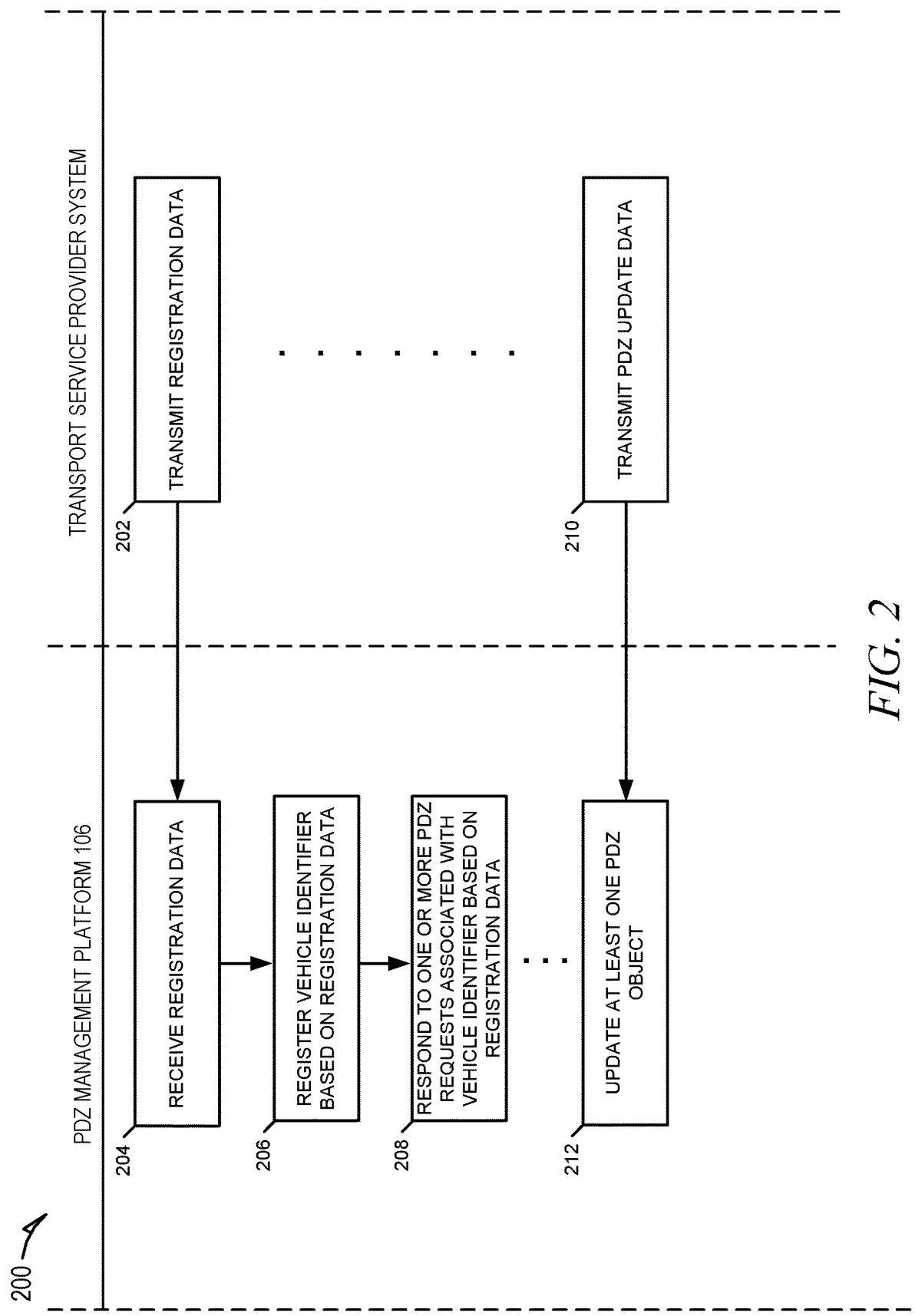
FIG. 2 is an interaction diagram depicting exchanges between a PDZ tracking system and a transport service provider system in performing a method of associating one or more vehicles with one or more PDZs, according to some embodiments.

FIG. 2 is an interaction diagram depicting exchanges between the PDZ management platform 106 and a transport service provider system in performing a method of associating one or more vehicles with one or more PDZs, according to some embodiments. In the context of FIG. 2, a transport service provider may register vehicles with the PDZ management platform 106 such that the PDZ management platform 106 may respond to PDZ requests from the vehicles with PDZs that are usable by the vehicles. That is, the PDZ management platform 106 responds to PDZ requests with PDZs that the requesting vehicle is permitted to and/or capable of utilizing. As an example, the transport service provider may register a fleet of third-party AVs with the PDZ management platform 106 to ensure that each AV in the fleet uses only certain PDZs. As will be discussed, the transport service provider is further enabled to provide updates to information maintained and used by the PDZ management platform 106.

As shown in FIG. 2, at operation 202, the transport service provider system transmits (e.g., via one of the APIs 107) registration data 108 to the PDZ management platform 106. The registration data 108 comprises a vehicle identifier and may further comprise data describing one or more PDZs for association with the vehicle identifier and/or one or more operational capabilities of vehicles associated with the vehicle identifier. The vehicle identifier may be unique to a single vehicle or may comprise a fleet identifier corresponding to a fleet of vehicles (e.g., a fleet of third-party AVs). Data describing a PDZ may include any one or more of a PDZ identifier, a geographic location (e.g., latitude and longitude), one on more associated locations for which the PDZ may be used for pick-up and drop-off operations, and a PDZ geometry. Operational capabilities specify certain vehicle capabilities that may vary between AVs, especially third-party AVs. For example, some AVs are capable of parallel parking while others are not. As another example, some AVs are capable of operating in reverse while others are not. As yet another example, some AVs may be equipped with four-wheel or all-wheel drive which would enable them to operate in certain conditions (e.g., icy roads) that other AVs may not be capable of operating in.

The PDZ management platform 106 receives the registration data 108 at operation 204, and the PDZ management platform 106 registers the vehicle identifier based on the registration data 108, at operation 206. In some embodiments, the registering of the vehicle identifier may comprise associating the vehicle identifier with one or more PDZ objects in the PDZ database maintained in data store 110 thereby associating the vehicle identifier with the corresponding PDZ. The PDZ management platform 106 may associate the vehicle identifier with the one or more PDZ objects by updating one or more aspects of the one or more PDZ objects in the PDZ database. For example, the PDZ management platform 106 may update one or more fields of a PDZ object that store associations with vehicle identifiers.

In some embodiments, the PDZ management platform 106 may use the list of PDZ identifiers included in the registration data to identify the set of PDZ objects, and may register the vehicle identifier by adding an association to the vehicle identifier to each PDZ object in the set. In some embodiments, the PDZ management platform 106 may use operational capabilities included in the registration data to identify the set of PDZ objects, and may register the vehicle identifier by adding an association to the vehicle identifier to each PDZ object in the set.

In some embodiments, the registering of the vehicle identifier may comprise associating one or more operational capabilities with one or more vehicle objects maintained in data store 110. The PDZ management platform 106 may associate the operational capabilities with the one or more vehicle objects by updating one or more aspects of the one or more vehicle objects. For example, the PDZ management platform 106 may update one or more fields of a vehicle object that storing information describing operational capabilities of a vehicle.

At operation 208, the PDZ management platform 106 responds to one or more PDZ requests associated with the vehicle identifier based on the registration data. Further details regarding the processing of PDZ requests by the PDZ management platform 106 are discussed below in reference to FIG. 3 and FIGS. 5-8.

After providing the initial registration data, the transport service provider system transmits PDZ update data to the PDZ management platform 106 (operation 210). The updated PDZ data may include information describing updates to one or more aspects of one or more PDZ objects. For example, the updated PDZ data may include one or more additional PDZs to associate with the vehicle identifier. In another example, the updated PDZ data may indicate that one or more PDZs should no longer be used by vehicles associated with the vehicle identifier. In yet another example, the updated PDZ data may specify an updated geometry for one or more PDZs.

At operation 212, the PDZ management platform 106 updates at least one PDZ object in the data store 110 based on the update data. In a first example, the PDZ management platform 106 updates a PDZ object to create an association between the corresponding PDZ and the vehicle identifier. In a second example, the PDZ management platform 106 updates a PDZ object to remove an association between the corresponding PDZ and the vehicle identifier.

In a third example, the PDZ management platform 106 updates a PDZ object based on an updated geometry included in the updated data. In some embodiments, the PDZ management platform 106 handles update to PDZ geometric using a consensus based approached. That is, the PDZ management platform 106 may wait to update a PDZ geometry until a predetermined threshold number of similar or identical requests are received or until similar or identical requests are received from a predetermined threshold number of third parties.

In a fourth example, the PDZ management platform 106 creates a new PDZ object based on the updated data. As noted above, in some instances the update data includes an updated PDZ geometry. In some embodiments, rather than updating an existing PDZ object as described above, the PDZ management platform 106 creates a new PDZ object that includes certain aspects of an existing PDZ object along with the updated geometry.

Figure 3:
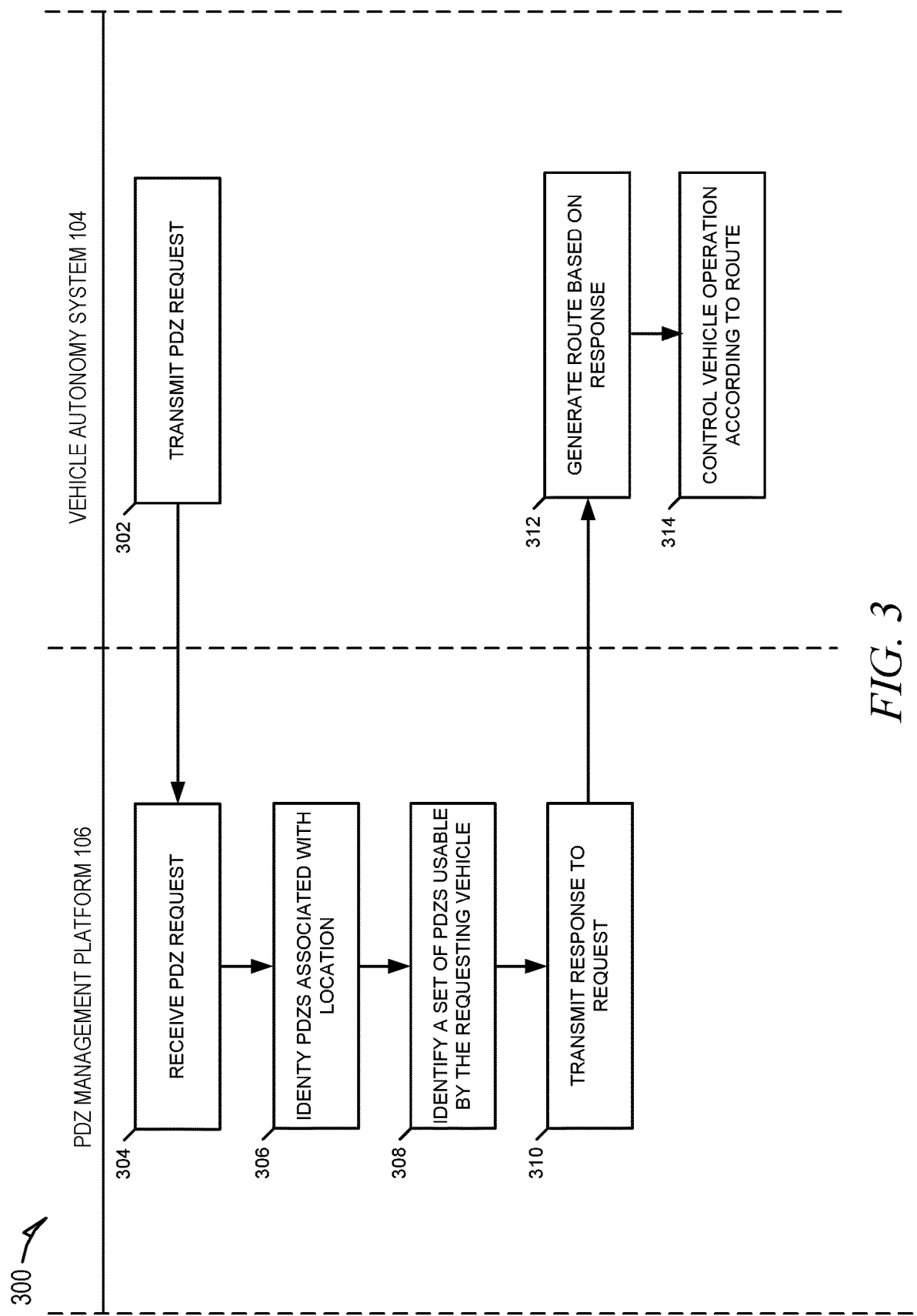
FIG. 3 is an interaction diagram depicting exchanges between a PDZ tracking system and a vehicular autonomy system in performing a method of facilitating vehicle routing based on PDZs that are associated with a requesting vehicle, according to some embodiments.

FIG. 3 is an interaction diagram depicting exchanges between the PDZ management platform 106 and the vehicular autonomy system 104 in performing a method 300 of facilitating vehicle routing based on PDZs associated with a requesting vehicle 102, according to some embodiments. As shown in FIG. 3, the method 300 begins at operation 302, where the vehicular autonomy system 104 transmits, via one of the APIs 107, a request to the PDZ management platform 106 for one or more PDZs that can be utilized by the vehicle 102 (e.g., a third-party AV) to perform a pick-up or drop-off operation. The location may, for example, be a target location of the vehicular autonomy system 104.

At operation 304, the PDZ management platform 106 receives the request. At operation 306, the PDZ management platform 106 identifies PDZs associated with the location included in the request. In some embodiments, the PDZ management platform 106 may identify a PDZ associated with the location based on a distance between the PDZ and the request location. In some embodiments, the PDZ management platform 106 may maintain a look-up table that identifies PDZs with pre-determined associations with particular locations and may use the look-up table to identify the set of PDZ associated with the request location. In some embodiments, the PDZ management platform 106 may identify a PDZs associated with the location based on a PDZ object in the data store 110 that includes an association with the location specified in the request.

At operation 308, the PDZ management platform 106 identifies, from the PDZs associated with the location, a set of PDZs that are usable by the vehicle 102 based on data stored in the data store 110. The PDZ management platform 106 may determine a PDZ is usable by the vehicle 102 based on a PDZ object stored in the data store 110 indicating an association with a vehicle identifier associated with the vehicle 102 (e.g., a fleet identifier), indicating that the operational capabilities of the vehicle 102 would allow the vehicle 102 to utilize the PDZ, or a combination of both.

At operation 310, the PDZ management platform 106 generates a response to the request based the set of PDZs that are usable by the vehicle 102 at the location. The response includes at least one PDZ from the set of PDZs. The response may further include any one or more of an estimated likelihood of availability of a PDZ, a suggested PDZ, a route to the suggested PDZ, and a set of instructions or a command that causes the vehicular autonomy system 104 to operate the vehicle 102 such that the vehicle travels to the suggested PDZ (e.g., in accordance with a generated route).

At operation 312, the vehicular autonomy system 104 generates a route based on the response. The route may correspond to a suggested PDZ included in the response or another PDZ in the response selected by the vehicular autonomy system 104. In embodiments in which the response includes a route generated by the PDZ management platform 106, the route generated by the vehicular autonomy system 104 may correspond to the route included in the response. The vehicular autonomy system 104 controls the operation of the vehicle according to the generated route, at operation 314. That is, the vehicular autonomy system 104 controls operations of the vehicle such that the vehicle travels along the generated route (e.g., to the suggested PDZ).

Figure 4:
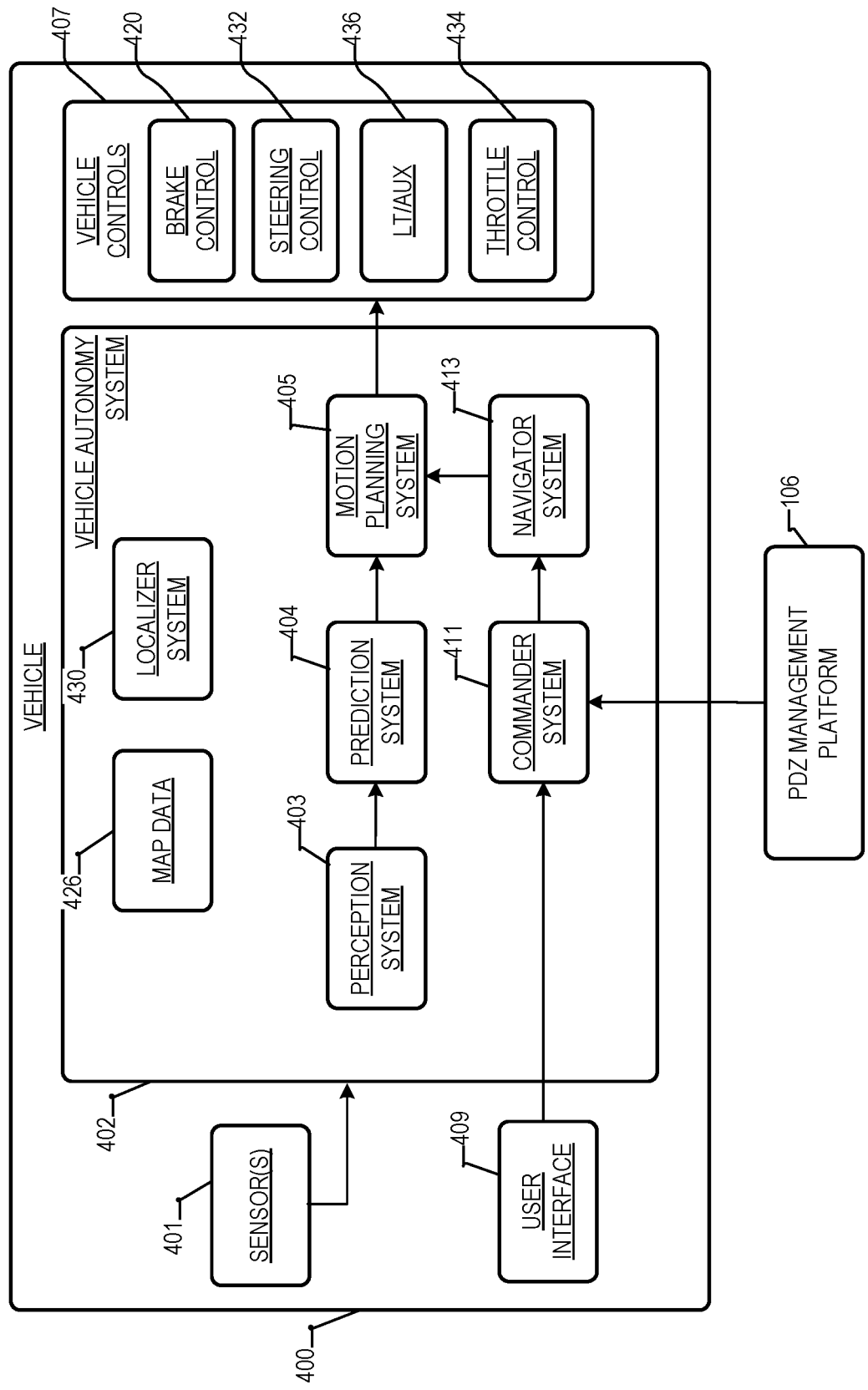
FIG. 4 is a block diagram depicting an example vehicle, according to some embodiments.
Figure 5:
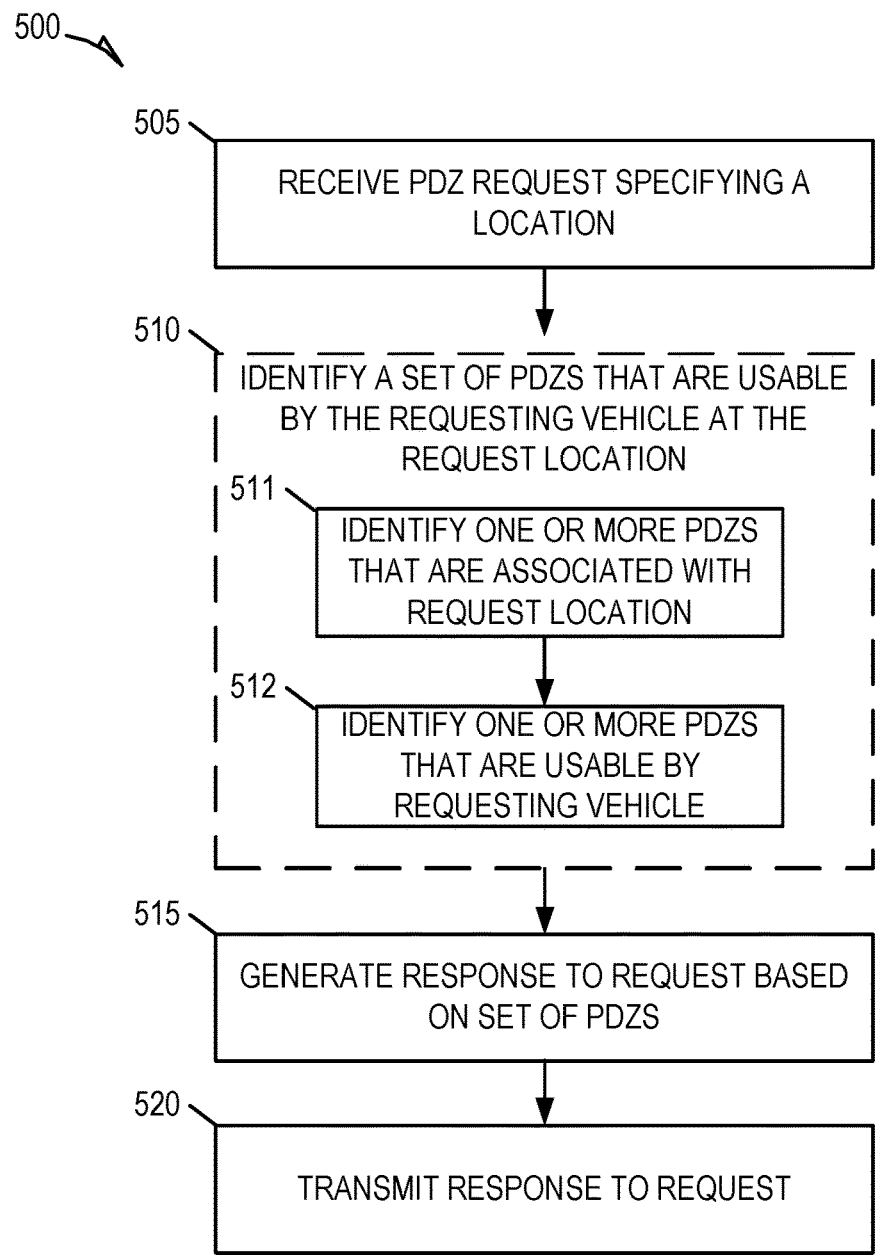
FIGS. 5-8 are flowcharts illustrating example operations of the PDZ tracking systems in performing a method for processing requests for PDZs associated with a location, according to some embodiments.

FIG. 4 is a block diagram depicting an example vehicle 400, according to some embodiments. To avoid obscuring the inventive subject matter with unnecessary detail, various functional components that are not germane to conveying an understanding of the inventive subject matter have been omitted from FIG. 4. However, a skilled artisan will readily recognize that various additional functional components may be included as part of the vehicle 400 to facilitate additional functionality that is not specifically described herein.

The vehicle 400 includes one or more sensors 401, a vehicular autonomy system 402, and one or more vehicle controls 407. The vehicle 400 can be an autonomous vehicle, as described herein.

The vehicular autonomy system 402 includes a commander system 411, a navigator system 413, a perception system 403, a prediction system 404, a motion planning system 405, and a localizer system 430 that cooperate to perceive the surrounding environment of the vehicle 400 and determine a motion plan for controlling the motion of the vehicle 400 accordingly.

The vehicular autonomy system 402 is engaged to control the vehicle 400 or to assist in controlling the vehicle 400. In particular, the vehicular autonomy system 402 receives sensor data from the one or more sensors 401, attempts to comprehend the environment surrounding the vehicle 400 by performing various processing techniques on data collected by the sensors 401, and generates an appropriate route through the environment. The vehicular autonomy system 402 sends commands to control the one or more vehicle controls 407 to operate the vehicle 400 according to the route.

Various portions of the vehicular autonomy system 402 receive sensor data from the one or more sensors 401. For example, the sensors 401 may include remote-detection sensors as well as motion sensors such as inertial measurement units (IMUs), one or more encoders, or one or more odometers. The sensor data can include information that describes the location of objects within the surrounding environment of the vehicle 400, information that describes the motion of the vehicle 400, and so forth.

The sensors 401 may also include one or more remote-detection sensors or sensor systems, such as a LIDAR, a RADAR, one or more cameras, and so forth. As one example, a LIDAR system of the one or more sensors 401 generates sensor data (e.g., remote-detection sensor data) that includes the location (e.g., in three-dimensional space relative to the LIDAR system) of a number of points that correspond to objects that have reflected a ranging laser. For example, the LIDAR system can measure distances by measuring the Time of Flight (TOF) that it takes a short laser pulse to travel from the sensor to an object and back, calculating the distance from the known speed of light.

As another example, a RADAR system of the one or more sensors 401 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, one or more cameras of the one or more sensors 401 may generate sensor data (e.g., remote sensor data) including still or moving images. Various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in an image or images captured by the one or more cameras. Other sensor systems can identify the location of points that correspond to objects as well.

As another example, the one or more sensors 401 can include a positioning system. The positioning system determines a current position of the vehicle 400. The positioning system can be any device or circuitry for analyzing the position of the vehicle 400. For example, the positioning system can determine a position by using one or more of inertial sensors, a satellite positioning system such as a GPS, based on an Internet Protocol (IP) address, by using triangulation and/or proximity to network access points or other network components (e.g., cellular towers, Wi-Fi access points), and/or other suitable techniques. The position of the vehicle 400 can be used by various systems of the vehicular autonomy system 402.

Thus, the one or more sensors 401 can be used to collect sensor data that includes information that describes the location (e.g., in three-dimensional space relative to the vehicle 400) of points that correspond to objects within the surrounding environment of the vehicle 400. In some implementations, the sensors 401 can be positioned at various different locations on the vehicle 400. As an example, in some implementations, one or more cameras and/or LIDAR sensors can be located in a pod or other structure that is mounted on a roof of the vehicle 400 while one or more RADAR sensors can be located in or behind the front and/or rear bumper(s) or body panel(s) of the vehicle 400. As another example, camera(s) can be located at the front or rear bumper(s) of the vehicle 400. Other locations can be used as well.

The localizer system 430 receives some or all of the sensor data from sensors 401 and generates vehicle poses for the vehicle 400. A vehicle pose describes the position and attitude of the vehicle 400. The vehicle pose (or portions thereof) can be used by various other components of the vehicular autonomy system 402 including, for example, the perception system 403, the prediction system 404, the motion planning system 405, and the navigator system 413.

The position of the vehicle 400 is a point in a three-dimensional space. In some examples, the position is described by values for a set of Cartesian coordinates, although any other suitable coordinate system may be used. The attitude of the vehicle 400 generally describes the way in which the vehicle 400 is oriented at its position. In some examples, attitude is described by a yaw about the vertical axis, a pitch about a first horizontal axis, and a roll about a second horizontal axis. In some examples, the localizer system 430 generates vehicle poses periodically (e.g., every second, every half second). The localizer system 430 appends time stamps to vehicle poses, where the time stamp for a pose indicates the point in time that is described by the pose. The localizer system 430 generates vehicle poses by comparing sensor data (e.g., remote sensor data) to map data 426 describing the surrounding environment of the vehicle 400.

In some examples, the localizer system 430 includes one or more pose estimators and a pose filter. Pose estimators generate pose estimates by comparing remote-sensor data (e.g., LIDAR, RADAR) to map data. The pose filter receives pose estimates from the one or more pose estimators as well as other sensor data such as, for example, motion sensor data from an IMU, encoder, or odometer. In some examples, the pose filter executes a Kalman filter or machine learning algorithm to combine pose estimates from the one or more pose estimators with motion sensor data to generate vehicle poses. In some examples, pose estimators generate pose estimates at a frequency less than the frequency at which the localizer system 430 generates vehicle poses. Accordingly, the pose filter generates some vehicle poses by extrapolating from a previous pose estimate utilizing motion sensor data.

Vehicle poses and/or vehicle positions generated by the localizer system 430 can be provided to various other components of the vehicular autonomy system 402. For example, the commander system 411 may utilize a vehicle position to determine whether to respond to a call from a dispatch system.

The commander system 411 determines a set of one or more target locations that are used for routing the vehicle 400. The target locations can be determined based on user input received via a user interface 409 of the vehicle 400. The user interface 409 may include and/or use any suitable input/output device or devices. In some examples, the commander system 411 determines the one or more target locations considering data received from PDZ management platform 106.

PDZ management platform 106 can be programmed to provide information to multiple vehicles, for example, as part of a fleet of vehicles for moving passengers and/or cargo. Data from PDZ management platform 106 can be provided to each vehicle via a wireless network, for example. As will be discussed in further detail below, PDZ management platform 106 is responsible for responding to requests for PDZs.

The navigator system 413 receives one or more target locations from the commander system 411 or user interface 409 along with map data 426. Map data 426, for example, may provide detailed information about the surrounding environment of the vehicle 400. Map data 426 can provide information regarding identity and location of different roadways and segments of roadways (e.g., lane segments). A roadway is a place where the vehicle 400 can drive and may include, for example, a road, a street, a highway, a lane, a parking lot, or a driveway.

From the one or more target locations and the map data 426, the navigator system 413 generates route data describing a route for the vehicle to take to arrive at the one or more target locations.

In some implementations, the navigator system 413 determines route data based on applying one or more cost functions and/or reward functions for each of one or more candidate routes for the vehicle 400. For example, a cost function can describe a cost (e.g., a time of travel) of adhering to a particular candidate route while a reward function can describe a reward for adhering to a particular candidate route. For example, the reward can be of an opposite sign to that of cost. Route data is provided to the motion planning system 405, which commands the vehicle controls 407 to implement the route or route extension, as described herein.

The perception system 403 detects objects in the surrounding environment of the vehicle 400 based on sensor data, map data 426, and/or vehicle poses provided by the localizer system 430. For example, map data 426 used by the perception system 403 may describe roadways and segments thereof and may also describe: buildings or other items or objects (e.g., lampposts, crosswalks, curbing); location and directions of traffic lanes or lane segments (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicular autonomy system 402 in comprehending and perceiving its surrounding environment and its relationship thereto.

In some examples, the perception system 403 determines state data for one or more of the objects in the surrounding environment of the vehicle 400. State data describes a current state of an object (also referred to as features of the object). The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the vehicle 400; minimum path to interaction with the vehicle 400; minimum time duration to interaction with the vehicle 400; and/or other state information.

In some implementations, the perception system 403 can determine state data for each object over a number of iterations. In particular, the perception system 403 updates the state data for each object at each iteration. Thus, the perception system 403 detects and tracks objects, such as vehicles, that are proximate to the vehicle 400 over time.

The prediction system 404 is configured to predict one or more future positions for an object or objects in the environment surrounding the vehicle 400 (e.g., an object or objects detected by the perception system 403). The prediction system 404 generates prediction data associated with one or more of the objects detected by the perception system 403. In some examples, the prediction system 404 generates prediction data describing each of the respective objects detected by the prediction system 404.

Prediction data for an object can be indicative of one or more predicted future locations of the object. For example, the prediction system 404 may predict where the object will be located within the next 5 seconds, 30 seconds, 200 seconds, and so forth. Prediction data for an object may indicate a predicted trajectory (e.g., predicted path) for the object within the surrounding environment of the vehicle 400. For example, the predicted trajectory (e.g., path) can indicate a path along which the respective object is predicted to travel over time (and/or the speed at which the object is predicted to travel along the predicted path). The prediction system 404 generates prediction data for an object, for example, based on state data generated by the perception system 403. In some examples, the prediction system 404 also considers one or more vehicle poses generated by the localizer system 430 and/or map data 426.

In some examples, the prediction system 404 uses state data indicative of an object type or classification to predict a trajectory for the object. As an example, the prediction system 404 can use state data provided by the perception system 403 to determine that a particular object (e.g., an object classified as a vehicle) approaching an intersection and maneuvering into a left-turn lane intends to turn left. In such a situation, the prediction system 404 predicts a trajectory (e.g., path) corresponding to a left turn for the vehicle 400 such that the vehicle 400 turns left at the intersection. Similarly, the prediction system 404 determines predicted trajectories for other objects, such as bicycles, pedestrians, parked vehicles, and s forth. The prediction system 404 provides the predicted trajectories associated with the object(s) to the motion planning system 405.

In some implementations, the prediction system 404 is a goal-oriented prediction system 404 that generates one or more potential goals, selects one or more of the most likely potential goals, and develops one or more trajectories by which the object can achieve the one or more selected goals. For example, the prediction system 404 can include a scenario generation system that generates and/or scores the one or more goals for an object and a scenario development system that determines the one or more trajectories by which the object can achieve the goals. In some implementations, the prediction system 404 can include a machine-learned goal-scoring model, a machine-learned trajectory development model, and/or other machine-learned models.

The motion planning system 405 commands the vehicle controls based at least in part on the predicted trajectories associated with the objects within the surrounding environment of the vehicle 400, the state data for the objects provided by the perception system 403, vehicle poses provided by the localizer system 430, map data 426, and route data provided by the navigator system 413. Stated differently, given information about the current locations of objects and/or predicted trajectories of objects within the surrounding environment of the vehicle 400, the motion planning system 405 determines control commands for the vehicle 400 that best navigate the vehicle 400 along the route or route extension relative to the objects at such locations and their predicted trajectories on acceptable roadways.

In some implementations, the motion planning system 405 can also evaluate one or more cost functions and/or one or more reward functions for each of one or more candidate control commands or sets of control commands for the vehicle 400. Thus, given information about the current locations and/or predicted future locations/trajectories of objects, the motion planning system 405 can determine a total cost (e.g., a sum of the cost(s) and/or reward(s) provided by the cost function(s) and/or reward function(s)) of adhering to a particular candidate control command or set of control commands. The motion planning system 405 can select or determine a control command or set of control commands for the vehicle 400 based at least in part on the cost function(s) and the reward function(s). For example, the motion plan that minimizes the total cost can be selected or otherwise determined.

In some implementations, the motion planning system 405 can be configured to iteratively update the route for the vehicle 400 as new sensor data is obtained from one or more sensors 401. For example, as new sensor data is obtained from one or more sensors 401, the sensor data can be analyzed by the perception system 403, the prediction system 404, and the motion planning system 405 to determine the motion plan.

The motion planning system 405 can provide control commands to one or more vehicle controls 407. For example, the one or more vehicle controls 407 can include throttle systems, brake systems, steering systems, and other control systems, each of which can include various vehicle controls (e.g., actuators or other devices that control gas flow, steering, braking) to control the motion of the vehicle 400. The various vehicle controls 407 can include one or more controllers, control devices, motors, and/or processors.

The vehicle controls 407 can include a brake control module 420. The brake control module 420 is configured to receive a braking command and bring about a response by applying (or not applying) the vehicle brakes. In some examples, the brake control module 420 includes a primary system and a secondary system. The primary system receives braking commands and, in response, brakes the vehicle 400. The secondary system may be configured to determine a failure of the primary system to brake the vehicle 400 in response to receiving the braking command.

A steering control system 432 is configured to receive a steering command and bring about a response in the steering mechanism of the vehicle 400. The steering command is provided to a steering system to provide a steering input to steer the vehicle 400.

A lighting/auxiliary control module 436 receives a lighting or auxiliary command. In response, the lighting/auxiliary control module 436 controls a lighting and/or auxiliary system of the vehicle 400. Controlling a lighting system may include, for example, turning on, turning off, or otherwise modulating headlines, parking lights, running lights, and so forth. Controlling an auxiliary system may include, for example, modulating windshield wipers, a defroster, and so forth.

A throttle control system 434 is configured to receive a throttle command and bring about a response in the engine speed or other throttle mechanism of the vehicle. For example, the throttle control system 434 can instruct an engine and/or engine controller or other propulsion system component to control the engine or other propulsion system of the vehicle 400 to accelerate, decelerate, or remain at its current speed.

Each of the perception system 403, the prediction system 404, the motion planning system 405, the commander system 411, the navigator system 413, and the localizer system 430 can be included in or otherwise a part of a vehicular autonomy system 402 configured to control the vehicle 400 based at least in part on data obtained from one or more sensors 401. For example, data obtained by one or more sensors 401 can be analyzed by each of the perception system 403, the prediction system 404, and the motion planning system 405 in a consecutive fashion in order to control the vehicle 400. While FIG. 4 depicts elements suitable for use in a vehicular autonomy system according to example aspects of the present disclosure, one of ordinary skill in the art will recognize that other vehicular autonomy system s can be configured to control an autonomous vehicle based on sensor data.

The vehicular autonomy system 402 includes one or more computing devices, which may implement all or parts of the perception system 403, the prediction system 404, the motion planning system 405, and/or the localizer system 430.

FIGS. 5-8 are flowcharts illustrating example operations of the PDZ tracking systems in performing a method for processing requests for PDZs associated with a target location, according to some embodiments. The method 500 may be embodied in computer-readable instructions for execution by a hardware component (e.g., a processor) such that the operations of the method 500 may be performed by the PDZ management platform 106. Accordingly, the method 500 is described below, by way of example with reference thereto. However, it shall be appreciated that the method 500 may be deployed on various other hardware configurations and is not intended to be limited to deployment on the PDZ management platform 106.

At operation 505, the PDZ management platform 106 receives, via one of the APIs 107, a request for one or more PDZs for utilization by a vehicle (e.g., a third-party AV; also referred to hereinafter as the "requesting vehicle") to perform a pick-up or drop-off operation at a specified location (also referred to hereinafter as the "request location"). The request may be received from a vehicular autonomy system 104 of the requesting vehicle (e.g., vehicle 102). The location may, for example, be a target location of the vehicular autonomy system 402. The requesting vehicle may, for example, submit the request prior to arriving at the specific location in anticipation of the requesting vehicle performing a pick-up or drop-off operation.

At operation 510, the PDZ management platform 106 identifies a set of PDZs that are usable by the requesting vehicle at the request location. The PDZ management platform 106 identifies the set of PDZs based on an association between one or more PDZ objects in the data store 110 and information associated with the requesting vehicle (e.g., a vehicle identifier or operational capabilities). As shown, operations 511 and 512 may be performed as part of operation 510. At operation 511, the PDZ management platform 106 identifies one or more PDZs that are associated with the request location and from the PDZs that are associated with the request location, the PDZ management platform 106 identifies one or more PDZs that are usable by the requesting vehicle, at operation 512.

In some embodiments, the PDZ management platform 106 may identify a PDZ associated with the location (as part of operation 511) based on a distance between the PDZ and the location. For example, the PDZ management platform 106 may identify a PDZ associated with the location based on a distance between the PDZ and the request location satisfying a threshold distance criterion. The PDZ management platform 106 may determine the distance based on map data 426.

In some embodiments, the PDZ management platform 106 may maintain a look-up table that identifies PDZs with pre-determined associations with particular locations. Consistent with these embodiments, the PDZ management platform 106 may use the look-up table to identify a PDZ associated with the request location (as part of operation 511).

In some embodiments, each PDZ object in the data store 110 may include information describing which locations the PDZ is associated with. The PDZ management platform 106 may identify a PDZ associated with the location (as part of operation 511) by locating one or more PDZ objects that include an association with the location specified in the request.

The PDZ management platform 106 may determine a PDZ is usable by the vehicle 102 based on a PDZ object stored in the data store 110 indicating an association with a vehicle identifier associated with the vehicle 102 (e.g., a fleet identifier), indicating that the operational capabilities of the vehicle 102 would allow the vehicle 102 to utilize the PDZ, or a combination of both.

The PDZ management platform 106 may identify PDZs that are usable by the requesting vehicle by performing a query of PDZ objects stored in the data store 110. The PDZ management platform 106 may locate the PDZ objects in the data store 110 based on a linkage of PDZ data records to a vehicle identifier associated with the requesting vehicle, operational capabilities of the requesting vehicle, or a combination of both.

In some embodiments, the PDZ management platform 106 may utilize a vehicle identifier associated with the requesting vehicle to query the data store 110 to identify PDZs associated with the requesting vehicle. For example, one or more PDZ objects in the data store 110 may include or be tagged with the vehicle identifier to indicate that the vehicle identifier is associated with and permitted to use the corresponding PDZ. Consistent with these embodiments, in querying the data store 110 using the vehicle identifier, the PDZ management platform 106 locates PDZ objects that include or are otherwise tagged with the vehicle identifier. Further details regarding the identification of the set of PDZs based on the vehicle identifier are discussed below in reference to FIG. 6.

In some embodiments, the PDZ management platform 106 may query the data store 110 based on operational capabilities of the requesting vehicle. For example, one or more PDZ objects in the data store 110 may specify one or more operational capabilities needed to utilize the corresponding PDZ. The PDZ management platform 106 may utilize the operational capabilities of the requesting vehicle to query the data store 110 to locate PDZ objects that correspond to the operational capabilities of the requesting vehicle. That is, the PDZ management platform 106 may identify only PDZs that the requesting vehicle is capable of utilizing while excluding PDZs that the requesting vehicle would be incapable of utilizing. Further details regarding the identification of the set of PDZs based on the vehicle identifier are discussed below in reference to FIG. 7.

At operation 515, the PDZ management platform 106 generates a response to the request based on the set of PDZs.

The request specifies at least one PDZ from the set of PDZs. The request may also include estimates of availability of any one or more PDZs. In some embodiments, the response may further include a suggested PDZ (e.g., selected based on a likelihood of availability) and may further include a route to the suggested PDZ based on a current location of the vehicle controlled by the vehicular autonomy system 104. In some embodiments, the response may further include instructions that cause the vehicular autonomy system 104 to control the vehicle such that the vehicle travels to the suggested PDZ, for example, along a route determined by the PDZ management platform 106.

At operation 520, the PDZ management platform 106 transmits the response to the vehicular autonomy system 104 responsive to the request. Upon receiving the response, the vehicular autonomy system 104 may control the vehicle such that it travels to the suggested PDZ along a route determined by the vehicular autonomy system 104 or a route provided by the the PDZ management platform 106.

Figure 6:
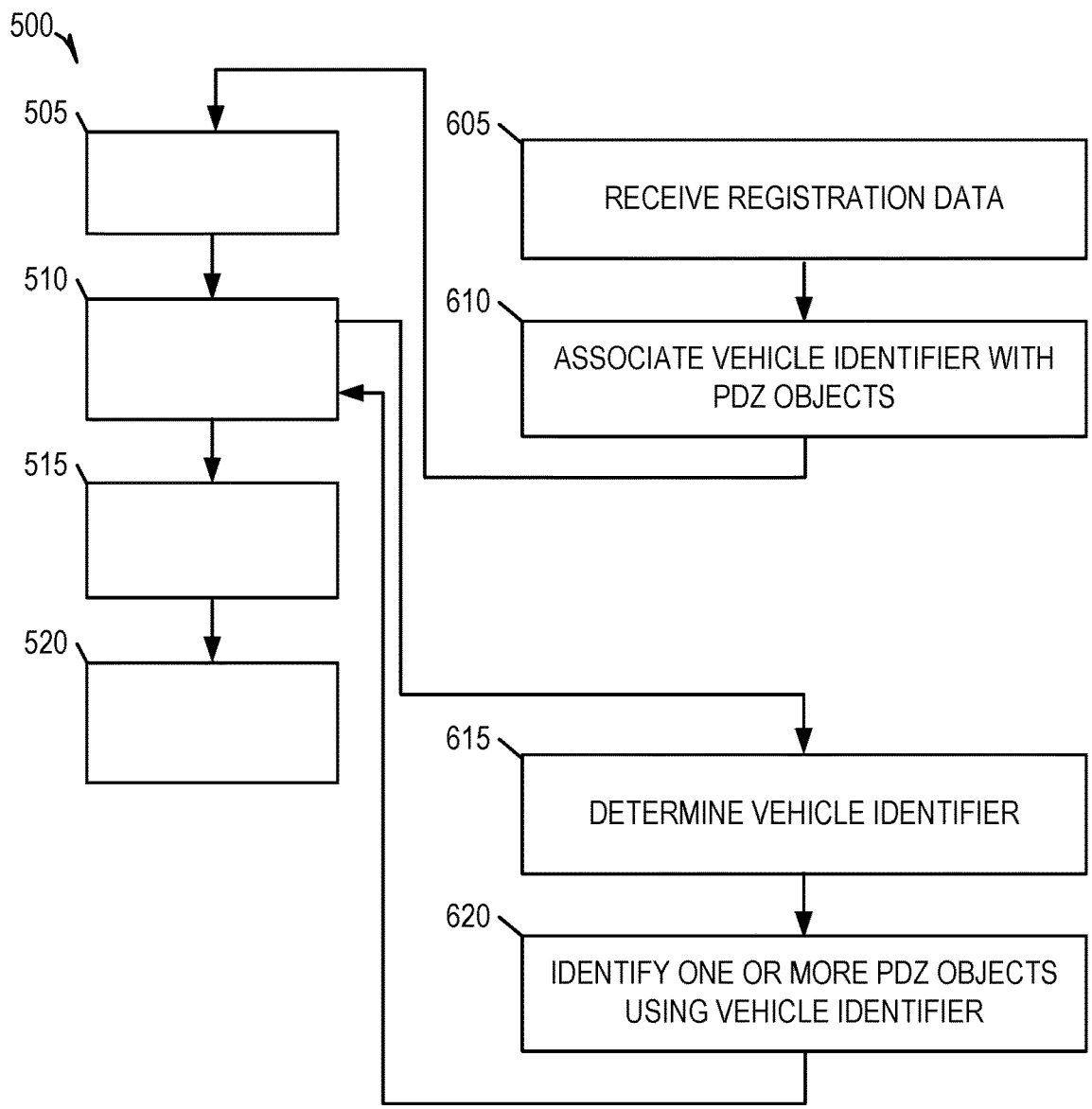

As shown in FIG. 6, the method 500 may, in some embodiments, include one or more of operations 605, 610, 615, and 620. Consistent with these embodiments, any one or more of the operations 605 and 610 may be performed prior to (e.g., in an offline process) operation 505 where PDZ management platform 106 receives a PDZ request.

At operation 605, the PDZ management platform 106 receives registration data. The registration data may comprise a list of PDZ identifiers associated with a vehicle identifier, operational capabilities associated with the vehicle identifier, or a combination of both. The registration data may be submitted via a graphical user interface (GUI) provided by the PDZ management platform 106 to a computing device that is in communication with the system. The vehicle identifier may be unique to the requesting vehicle or may correspond to a vehicle fleet in which the requesting vehicle is included. In an example, the vehicle identifier is an identifier of a fleet of third-party AVs, the list of PDZs identifiers corresponds to PDZs to be used by the third-party AVs in the fleet, and the operational capabilities are the operational capabilities of each AV in the fleet.

At operation 610, the PDZ management platform 106 associates the vehicle identifier with one or more PDZ objects based on the registration data. That is, the PDZ management platform 106 creates a linkage between one or more PDZ objects and the vehicle identifier in the data store 110. The one or more PDZ objects may correspond to a list of PDZs in the registration data or may correspond to one or more PDZs identified based on operational capabilities included in the registration data. Accordingly, in some embodiments, the PDZ management platform 106 may identifier a set of PDZ objects from the data store 110 based on operational capabilities. That is, the PDZ management platform 106 may identify PDZ objects corresponding to PDZs that may be utilized given the operational capabilities.

In associating the vehicle identifier with the one or more PDZ objects, the PDZ management platform 106 may update one or more PDZ objects in the data store 110 to indicate the association with the vehicle identifier. In some embodiments, the PDZ management platform 106 may update a PDZ object by adding a tag (also referred to by those of ordinary skill in the art as a "descriptor") to the PDZ object, where the tag comprises the vehicle identifier.

Consistent with these embodiments, the operations 615 and 620 may be performed as part of the operation 510, where the PDZ management platform 106 identifies the set of PDZs that are usable by the requesting vehicle at the request location. At operation 615, the PDZ management platform 106 determines a vehicle identifier of the requesting vehicle. In some embodiments, the vehicle identifier may be included in or provided with the request. In some embodiments, the PDZ management platform 106 may determine the vehicle identifier based on another identifier included in or provided with the request. In an example, the vehicle identifier comprises a fleet identifier, and the request comprises an identifier that uniquely identifies the requesting vehicle. In this example, the PDZ management platform 106 stores data describing a mapping between fleet identifiers and unique vehicle identifiers. The PDZ management platform 106 may utilize this mapping to determine the fleet identifier of the requesting vehicle.

At operation 620, the PDZ management platform 106 identifies one or more PDZ objects in the data store 110 using the vehicle identifier. For example, the PDZ management platform 106 may use the vehicle identifier to locate PDZ objects in the data store 110 that have an association with the vehicle identifier. Given that the vehicle identifier is associated with the list of PDZ identifiers, in querying the data store 110, the PDZ management platform 106 retrieves the PDZ objects corresponding to the list of PDZ identifiers.

Figure 7:
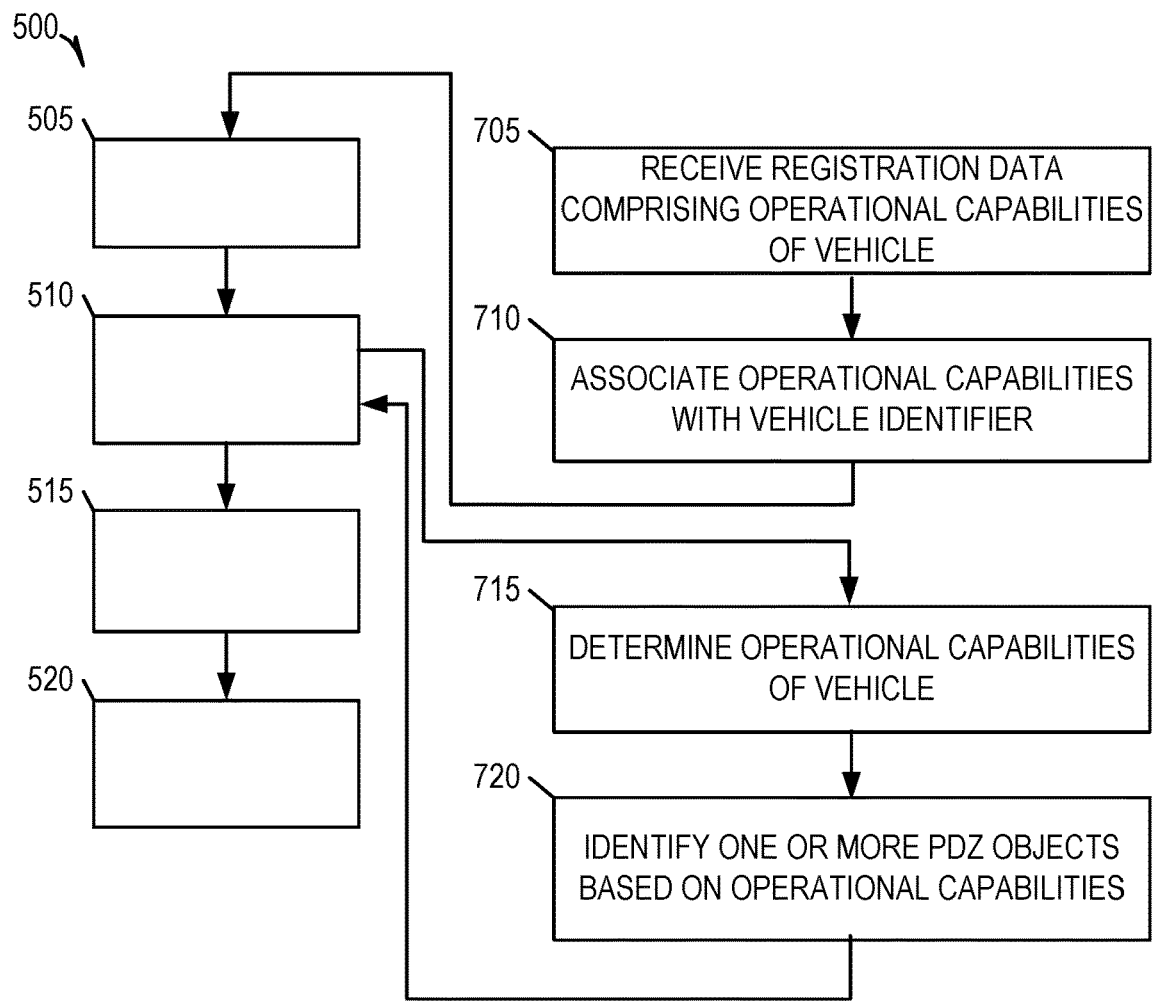

As shown in FIG. 7, the method 500 may, in some embodiments, include any one or more of operations 705, 710, 715, and 720. Consistent with these embodiments, any one or more of the operations 705 and 710 may be performed prior to (e.g., in an offline process) operation 505 where PDZ management platform 106 receives a PDZ request. As noted above, the data store 110 stores PDZ objects and any one of the PDZ objects may specify certain operational constraints that correspond to operational capabilities that are needed to utilize the corresponding PDZ described by the record.

At operation 705, the PDZ management platform 106 receives a registration request comprising data describing operational capabilities associated with a vehicle identifier associated with the vehicle. The data may, for example, describe capabilities of the vehicle such as traveling in reverse or parallel parking. The registration request may include data describing operational capabilities associated with a fleet of vehicles. That is, the vehicle identifier may correspond to a fleet identifier and the data may describe the shared operational capabilities of the fleet.

At operation 710, the PDZ management platform 106 associates the operational capabilities with the vehicle identifier within the data store 110. That is, the PDZ management platform 106 updates one or more fields of a vehicle object stored in the data store 110 corresponding to the vehicle identifier to include data describing the operational capabilities.

Consistent with these embodiments, the operations 715 and 720 may be performed as part of the operation 510 (e.g., in a run-time process) where the PDZ management platform 106 identifies the set of PDZs that are usable by the requesting vehicle at the request location. At operation 715, the PDZ management platform 106 determines the operational capabilities of the vehicle based on the information stored in the data store 110. The PDZ management platform 106 may use the vehicle identifier associated with the requesting vehicle to determine the operational capabilities from the data stored in the data store 110.

At operation 720, the PDZ management platform 106 identifies one or more PDZs based on the operational capabilities of the vehicle. In doing so, the PDZ management platform 106 compares the operational capabilities of the vehicle with the operational constraints for utilizing PDZs. An operational constraint for utilizing a PDZ comprises an operational capability needed to utilize a PDZ. In comparing the operational capabilities of the vehicle with the operational constraints of a PDZ, the PDZ management platform 106 identifies the PDZ for which the vehicle is capable of utilizing.

Figure 8:
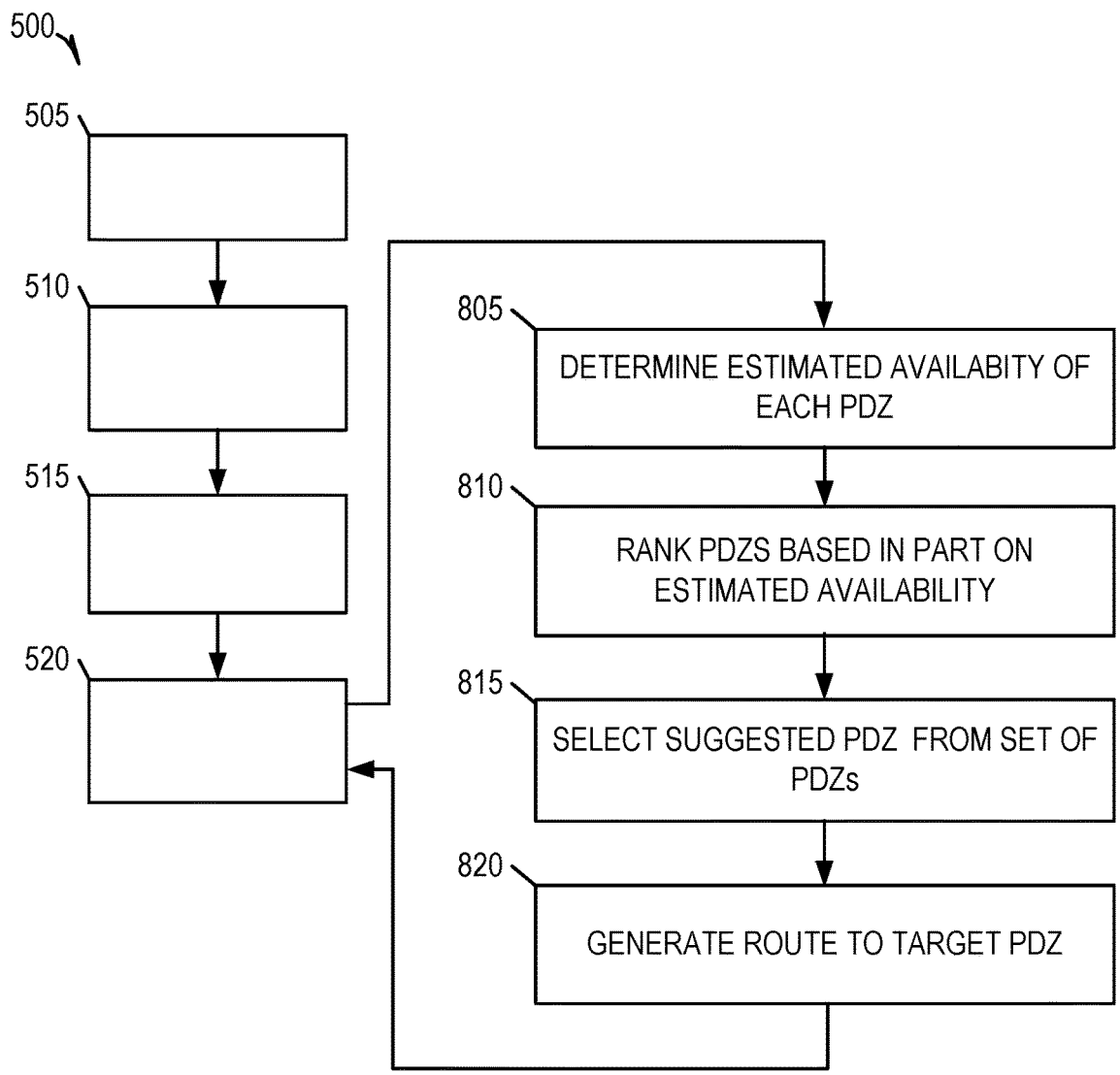

As shown in FIG. 8, the method 500 may, in some embodiments, include any one or more of operations 805, 810, 815, and 820. Consistent with these embodiments, any one or more of operations 805, 810, 815, and 820 may be performed as part of the operation 520 where the PDZ management platform 106 generates the response.

At operation 805, the PDZ management platform 106 determines an estimated availability of each PDZ in the set of PDZs using a probabilistic model. The estimated availability of a PDZ indicates a likelihood that the PDZ will be available (unoccupied) at an estimated time of arrival of the vehicle. Consistent with some embodiments, a probabilistic model of PDZ availability may be trained (e.g., in an offline process) using historical data. The historical data may, for example, includes any one or more of: user-generated information (e.g., user generated reports of an occupied or unoccupied PDZ); vehicle driving logs; vehicular sensor logs (e.g., comprising image sensor data, Radar data, Lidar data, etc.); traffic information; public transit schedules; parking restrictions; global position system (GPS) data from one or more vehicles (e.g., known location of one or more stopped vehicles); and parking spot occupancy data obtained from parking meters or other parking sensors. The historical data is analyzed to compute a probabilistic estimation of PDZ availability based on identified features (e.g., patterns) in the data. The training of the probabilistic estimation may include applying one of many known machine learning algorithms to the historical data.

The estimated availability of each PDZ may be based on one or more real-time indicia of PDZ availability. In some embodiments, the estimated time of arrival at each PDZ may be different and may differ from an estimated time of arrival of the vehicle at the request location. Consistent with these embodiments, PDZ management platform 106 may determine an estimated time of arrival of the vehicle at each PDZ and use respective estimated times of arrival in estimating the availability of the corresponding PDZ. The PDZ management platform 106 may determine the estimated time of arrival at a given PDZ based on a current location of the vehicle, a distance between the current location of the vehicle and the PDZ, traffic information, legal restrictions such as speed limits, operational capabilities of the vehicle, and any obstacles in a route from the current location of the vehicle and the PDZ.

In some embodiments, the PDZ management platform 106 determines the estimated time of arrival at a given PDZ based on a route of the vehicle. The route may be determined by PDZ management platform 106 or may be determined by the vehicular autonomy system 104 of the vehicle. As an example, PDZ management platform 106 can estimate the projected speed of the vehicle over the remainder of its route. The projected speed of the second vehicle can be based on the speed limit of the roadways to be traversed to reach the target location, traffic conditions on the roadways to be traversed to reach the target location, and/or other suitable factors.

At operation 810, the PDZ management platform 106 ranks the PDZs in the subset. In an example, the PDZ tracking system ranks the PDZs based on the estimated availability of each PDZ. In another example, the PDZ tracking system ranks the PDZs based on a distance to the request location. In yet another example, the PDZ tracking system ranks the PDZs based on a distance of a determined route from the current location of the requesting vehicle to each PDZ.

At operation 815, the PDZ management platform 106 selects a suggested PDZ from the subset of PDZs. The PDZ management platform 106 selects the suggested PDZ from based on any one or more of the estimates of availabilities of the PDZs, a proximity to other PDZs, an estimated time of arrival at the PDZ, and operational capabilities of the vehicle. In a first example, PDZ management platform 106 selects the PDZ having the highest likelihood of being available. In a second example, rather than selecting a first PDZ corresponding to the highest likelihood of being available, the PDZ management platform 106 selects a second PDZ that has a lower likelihood of being available, but that is near (e.g., within a predetermined threshold distance) a third PDZ that has a similar likelihood of availability. In a third example, the PDZ management platform 106 may determine, based on the operational capabilities of the vehicle, that the vehicle is incapable of traveling to a first PDZ corresponding to the highest likelihood of being available and instead selects a second PDZ that has the second highest likelihood of being available and to which the vehicle is capable of traveling. In a fourth example, the PDZ management platform 106 may select a first PDZ that has a lower likelihood of availability than a second PDZ with the highest likelihood of availability but an estimated time of arrival that is before the estimated time of arrival of the second PDZ.

At operation 820, the PDZ management platform 106 generates a route to the suggested PDZ using map data 426. The route connects a current location of the vehicle to the suggested PDZ. The PDZ management platform 106 generates the route based on the current location of the vehicle and operational capabilities of the vehicle. In some embodiments, the PDZ management platform 106 may generate the route based on a current route of the vehicle. For example, the PDZ management platform 106 may reduce or extend a current route of the vehicle.

In light of the forgoing description, it shall be appreciated that the response may include the subset of PDZ identified at operation 515, an estimated likelihood of availability of each PDZ, a ranked list of PDZs, a suggested PDZ, and a generated route to the suggested PDZ. However, in other embodiments, the response may exclude any one or more of the ranked list of PDZs, the suggested PDZ or the generated route. For example, in some embodiments, the request includes the suggested PDZ along with a suggested route, and the vehicular autonomy system 104 determines whether to use the suggested route or generate a route of its own. As another example, the response may include only the suggested PDZ, and it is up to the vehicular autonomy system 104 to generate the route to the suggested PDZ. As yet another example, the response may only include estimated availabilities of one or more PDZs and it is up to the vehicular autonomy system 104 to determine which PDZ to travel to and to generate the route to the selected PDZ.

Figure 9:
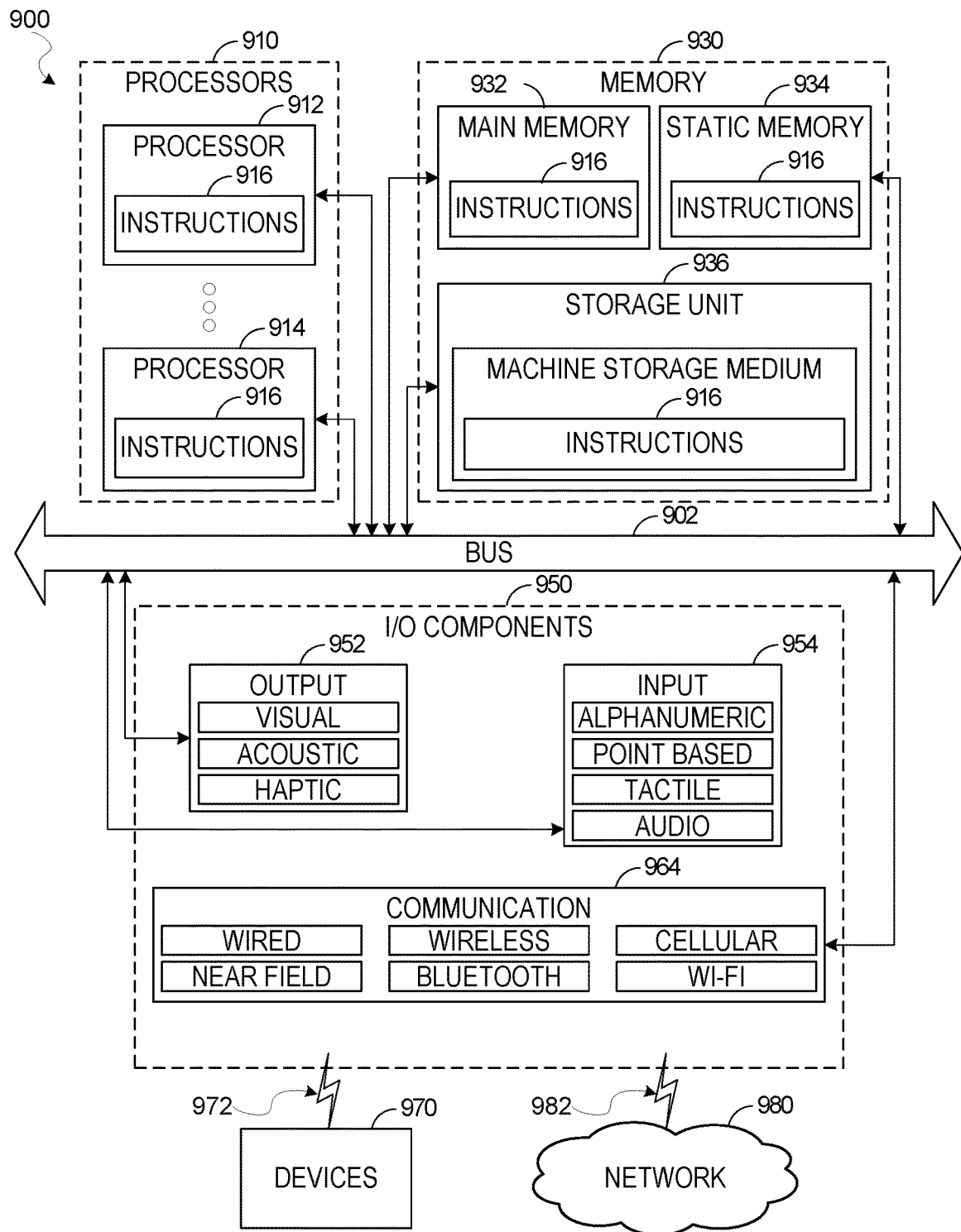
FIG. 9 is a diagrammatic representation of a machine in the example form of a computer system within which a set of instructions for causing the machine to perform any one or more of the methodologies discussed herein may be executed.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the method 500. In this way, the instructions 916 transform a general, non-programmed machine into a particular machine 900, such as the vehicular autonomy system 104, that is specially configured to carry out the described and illustrated functions in the manner described here. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and input/output (I/O) components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, both accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The devices 970 may be another machine or any of a wide variety of peripheral devices (e.g., a peripheral device coupled via a universal serial bus (USB)).

Executable Instructions and Machine Storage Medium

The various memories (e.g., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one processor of a machine; and
   a memory storing instructions that cause the at least one processor to perform operations comprising:
   comparing operational constraints associated with physical geometry of a plurality of pick- up/drop off zones (PDZs) at a specified location to operational capabilities comprising one or more modes of movement of an autonomous vehicle (AV) to identify a set of PDZs of the plurality of PDZs that the AV is capable of using at the specified location based on an association between one or more PDZ objects in a data store and mode of movement information associated with the AV, each of the one or more PDZ objects comprising data describing a PDZ;
   transmitting at least one PDZ identifier corresponding to the set of PDZs;
   determining that a first PDZ in the set of PDZs is associated with a first likelihood of being available and that a second PDZ in the set of PDZs is associated with a second likelihood of being available;
   ranking the set of PDZs based on a distance of a determined route of the AV to each PDZ in the set of PDZs, the first likelihood of being available, and the second likelihood of being available;
   determining that the second likelihood of being available associated with the second PDZ is lower than the first likelihood of being available associated with the first PDZ;
   selecting, as an individual PDZ, the second PDZ at least in part in response to determining that the second likelihood of being available is lower than the first likelihood of being available; and
   autonomously utilizing one or more sensors of the AV to autonomously navigate the AV along a route to the individual PDZ of the set of PDZs based on the ranked set of PDZs.

2. The system of claim 1, wherein the one or more modes of movement of the vehicle comprise at least one of operating in reverse or performing parallel parking, and wherein the identifying of the set of PDZs comprises:
   identifying one or more PDZs that are associated with the specified location; and
   identifying, from the one or more PDZs that are associated with the specified location, at least one PDZ that is usable by the vehicle.

3. The system of claim 1, wherein the identifying of the set of PDZs that are usable by the vehicle at the specified location comprises:
   determining a vehicle identifier that is unique to a single vehicle comprising the AV; and
   identifying, using the vehicle identifier, a set of PDZ objects in the data store based on an association between the vehicle identifier and each PDZ object in the set of PDZ objects, the set of PDZs being identified in response to determining that the vehicle is capable of operating in reverse or performing parallel parking within the physical geometries of the identified set of PDZs.

4. The system of claim 3, wherein the operations further comprise:

receiving registration data comprising the vehicle identifier and at least one of a list of PDZ identifiers or one or more operational capabilities associated with the vehicle identifier; and associating the vehicle identifier with the set of PDZ objects based on the registration data.

5. The system of claim 1, wherein the operations further comprise:

receiving a plurality of requests to update geometry information associated with a PDZ object;

identifying a subset of the plurality of requests that are similar;

determining that a number of requests in the subset of the plurality of requests transgresses a threshold number of requests; and in response to determining that the number of requests in the subset of the plurality of requests transgresses the threshold number of requests, updating the PDZ object based on updated geometry information received in the subset of the plurality of requests.

6. The system of claim 1, wherein the identifying of the set of PDZs that are usable by the vehicle at the specified location comprises:

determining operational capabilities of the vehicle; and identifying one or more PDZs based on the operational capabilities of the vehicle and operational constraints of the each PDZ in the set PDZs.

7. The system of claim 6, wherein the operations further comprise:

receiving registration data describing operational capabilities of the vehicle; and associating the operational capabilities of the vehicle with a vehicle identifier associated with the vehicle.

8. The system of claim 1, further comprising:

selecting a suggested PDZ from the set of PDZs; and generating a route for the vehicle to the suggested PDZ based on a current location of the vehicle.

9. The system of claim 1, wherein the first likelihood comprises a first value different from a second value of the second likelihood.

10. The system of claim 1, further comprising:

processing historical data associated with the set of PDZs by a machine learning model comprising a probabilistic model to determine an estimated likelihood of availability for at least one PDZ in the set of PDZs, the machine learning model trained in an offline process using patterns of the historical data.

11. A computer-implemented method comprising:

comparing operational constraints associated with physical geometry of a plurality of pick-up/drop off zones (PDZs) at a specified location to operational capabilities comprising one or more modes of movement of an autonomous vehicle (AV) to identify a set of PDZs of the plurality of PDZs that the AV is capable of using at the specified location based on an association between one or more PDZ objects in a data store and mode of movement information associated with the AV, each of the one or more PDZ objects comprising data describing a PDZ;

transmitting at least one PDZ identifier corresponding to the set of PDZs;

determining that a first PDZ in the set of PDZs is associated with a first likelihood of being available and that a second PDZ in the set of PDZs is associated with a second likelihood of being available;

ranking the set of PDZs based on a distance of a determined route of the AV to each PDZ in the set of PDZs, the first likelihood of being available, and the second likelihood of being available;

determining that the second likelihood of being available associated with the second PDZ is lower than the first likelihood of being available associated with the first PDZ;

selecting, as an individual PDZ, the second PDZ at least in part in response to determining that the second likelihood of being available is lower than the first likelihood of being available; and autonomously utilizing one or more sensors of the AV to autonomously navigate the AV along a route to the individual PDZ of the set of PDZs based on the ranked set of PDZs.

12. The computer-implemented method of claim 11, comprising:

selecting the second PDZ as the individual PDZ in response to determining that a third PDZ in the set of PDZs is within a threshold proximity to the second PDZ and has a third likelihood of being available that corresponds to the second likelihood.

13. The computer-implemented method of claim 11, wherein the identifying of the set of PDZs that are usable by the vehicle at the specified location comprises:

determining the vehicle identifier associated with the vehicle; and identifying, using the vehicle identifier, a set of PDZ objects in the data store, each PDZ object in the set of PDZ objects including an association with the vehicle identifier.

14. The computer-implemented method of claim 13, further comprising:

receiving registration data comprising the vehicle identifier and at least one of a list of PDZ identifiers or one or more operational capabilities associated with the vehicle identifier; and associating the vehicle identifier with the set of PDZ objects based on the registration data.

15. The computer-implemented method of claim 14, wherein the operations further comprise:

identifying the set of PDZ objects based on the one or more operational capabilities included in the registration data.

16. The computer-implemented method of claim 11, wherein the identifying of the set of PDZs that are usable by the vehicle at the specified location comprises:

determining operational capabilities of the vehicle; and identifying one or more PDZs based on the operational capabilities of the vehicle and operational constraints of the each PDZ in the set PDZs.

17. The computer-implemented method of claim 16, wherein the operations further comprise:

receiving a registration data describing operational capabilities of the vehicle; and associating the operational capabilities of the vehicle with the vehicle identifier associated with the vehicle.

18. The computer-implemented method of claim 11, the operations comprising:

selecting a suggested PDZ from the set of PDZs; and generating a route for the vehicle to the suggested PDZ based on a current location of the vehicle.

19. The computer-implemented method of claim 11, the operations comprising:

ranking the one or more PDZs based on the distance between a current location of the AV and each PDZ in the set of PDZs.

20. A tangible computer-readable medium storing instructions that, when executed by one or more processors of a machine, cause the one or more processors of the machine to perform operations comprising:

comparing operational constraints associated with physical geometry of a plurality of pick-up/drop off zones (PDZs) at a specified location to operational capabilities comprising one or more modes of movement of an autonomous vehicle (AV) to identify a set of PDZs of the plurality of PDZs that the AV is capable of using at the specified location based on an association between one or more PDZ objects in a data store and mode of movement information associated with the AV, each of the one or more PDZ objects comprising data describing a PDZ;

transmitting at least one PDZ identifier corresponding to the set of PDZs;

determining that a first PDZ in the set of PDZs is associated with a first likelihood of being available and that a second PDZ in the set of PDZs is associated with a second likelihood of being available;

ranking the set of PDZs based on a distance of a determined route of the AV to each PDZ in the set of PDZs, the first likelihood of being available, and the second likelihood of being available;

determining that the second likelihood of being available associated with the second PDZ is lower than the first likelihood of being available associated with the first PDZ:

selecting, as an individual PDZ, the second PDZ at least in part in response to determining that the second likelihood of being available is lower than the first likelihood of being available; and autonomously utilizing one or more sensors of the AV to autonomously navigate the AV along a route to the individual PDZ of the set of PDZs based on the ranked set of PDZs.

* * * * *

UNITED STATES PATENT AND TRADEMARK OFFICE
CERTIFICATE OF CORRECTION

PATENT NO. : 12,264,922 B2
APPLICATION NO. : 16/947028
DATED : April 1, 2025
INVENTOR(S) : Niemiec et al.

Page 1 of 1

It is certified that error appears in the above-identified patent and that said Letters Patent is hereby corrected as shown below:

In the Claims

In Column 26, Line 10, in Claim 1, delete "pick- up/drop" and insert --pick-up/drop-- therefor Signed and Sealed this
Twenty-sixth Day of August, 2025

Coke Morgan Stewart
*Acting Director of the United States Patent and Trademark Office*